US012084839B2

(12) United States Patent
Dumnov et al.

(10) Patent No.: US 12,084,839 B2
(45) Date of Patent: Sep. 10, 2024

(54) HYDRAULIC APPARATUS AND METHOD FOR A VEHICLE

(71) Applicant: DANFOSS SCOTLAND LIMITED, Scotland (GB)

(72) Inventors: Daniil Dumnov, Edinburgh (GB); Niall Caldwell, Edinburgh (GB)

(73) Assignee: DANFOSS SCOTLAND LIMITED, Edinburgh (GB)

( * ) Notice: Subject to any disclaimer, the term of this patent is extended or adjusted under 35 U.S.C. 154(b) by 0 days.

(21) Appl. No.: 18/164,682

(22) Filed: Feb. 6, 2023

(65) Prior Publication Data

US 2023/0250616 A1 Aug. 10, 2023

(30) Foreign Application Priority Data

Feb. 7, 2022 (EP) .................................... 22155493

(51) Int. Cl.
*E02F 9/22* (2006.01)
*F15B 1/02* (2006.01)
(Continued)

(52) U.S. Cl.
CPC .......... *E02F 9/2292* (2013.01); *E02F 9/2217* (2013.01); *E02F 9/2221* (2013.01);
(Continued)

(58) Field of Classification Search
CPC .................... F15B 1/024; F15B 11/024; F15B 2011/0243; F15B 2011/0246;
(Continued)

(56) References Cited

U.S. PATENT DOCUMENTS 6,748,738 B2 * 6/2004 Smith ..................... F15B 21/14 91/454
7,788,915 B2 * 9/2010 Shiozaki ................ F15B 21/14 60/413
(Continued)

FOREIGN PATENT DOCUMENTS

JP 2008-087653 A 4/2008
JP 2012-524227 A 10/2012
(Continued)

OTHER PUBLICATIONS

Aug. 1, 2022 Extended Search Report issued in European Patent Application No. 22155493.4.
(Continued)

*Primary Examiner* — Michael Leslie
(74) *Attorney, Agent, or Firm* — Oliff PLC

(57) ABSTRACT

A vehicle includes: a prime mover; a hydraulic fluid manifold; a hydraulic machine; a hydraulic accumulator; one or more hydraulic actuators; a valve arrangement; and a controller. The controller is configured to receive an actuator demand signal indicative of a demand to move the one or more hydraulic actuators; and to control the hydraulic machine and the valve arrangement to cause movement of the one or more actuators in accordance with the actuator demand signal by bringing the hydraulic accumulator into fluid communication with a first actuator chamber of the one or more hydraulic actuators, and to synchronise therewith changing a pressure in a second actuator chamber of the one or more hydraulic actuators. The second actuator chamber is in fluid communication with the hydraulic machine.

20 Claims, 5 Drawing Sheets

(51) Int. Cl.

| | |
|---|---|
| ***F15B 1/033*** | (2006.01) |
| ***F15B 11/024*** | (2006.01) |
| ***F15B 11/16*** | (2006.01) |
| ***F15B 11/17*** | (2006.01) |
| ***F15B 21/14*** | (2006.01) |

(52) U.S. Cl.
CPC .......... *E02F 9/2235* (2013.01); *E02F 9/2242* (2013.01); *E02F 9/2296* (2013.01); *F15B 1/024* (2013.01); *F15B 1/033* (2013.01); *F15B 11/024* (2013.01); *F15B 11/165* (2013.01); *F15B 11/17* (2013.01); *F15B 21/14* (2013.01); *F15B 2211/20546* (2013.01); *F15B 2211/20569* (2013.01); *F15B 2211/20576* (2013.01); *F15B 2211/212* (2013.01); *F15B 2211/625* (2013.01)

(58) Field of Classification Search
CPC ........ F15B 11/165; F15B 11/17; F15B 21/14; E02F 9/2217; E02F 9/2235; E02F 9/2242
See application file for complete search history.

(56) References Cited

U.S. PATENT DOCUMENTS

| | | | | |
|---|---|---|---|---|
| 8,249,907 | B2 * | 8/2012 | Blagg | G06Q 10/063112 705/7.14 |
| 9,051,944 | B2 * | 6/2015 | Wen | F15B 1/024 |
| 10,161,423 | B2 * | 12/2018 | Rampen | F15B 11/162 |
| 10,180,135 | B2 * | 1/2019 | Caldwell | F15B 7/006 |
| 10,273,567 | B2 * | 4/2019 | Isaac | C22C 38/32 |
| 10,370,824 | B2 * | 8/2019 | Hiraku | E02F 9/2292 |
| 10,415,214 | B2 * | 9/2019 | Kishida | E02F 9/2217 |
| 10,584,722 | B2 * | 3/2020 | Hijikata | F15B 11/165 |
| 10,907,666 | B2 * | 2/2021 | Hijikata | F15B 1/024 |
| 11,111,651 | B2 * | 9/2021 | Shimizu | F15B 11/17 |
| 2003/0213238 | A1 | 11/2003 | Smith | |
| 2009/0255246 | A1 | 10/2009 | Wu et al. | |
| 2013/0333378 | A1 | 12/2013 | Wen | |
| 2015/0104332 | A1 | 4/2015 | Calonius et al. | |
| 2015/0192149 | A1 | 7/2015 | Ma et al. | |
| 2017/0144875 | A1 | 5/2017 | Clerc | |

FOREIGN PATENT DOCUMENTS

| | | | |
|---|---|---|---|
| JP | 2013-501889 | A | 1/2013 |
| JP | 2020-197304 | A | 12/2020 |
| WO | 2010/026678 | A1 | 3/2010 |
| WO | 2017/144875 | A1 | 8/2017 |

OTHER PUBLICATIONS

Heybroek, Kim, and Mika Sahlman, “A hydraulic hybrid excavator based on multi-chamber cylinders and secondary control—design and experimental validation”, International Journal of Fluid Power, 2018, vol. 19, No. 2, pp. 91-105.
Donkov, Viktor Hristov et al., “Digital Hydraulic Technology for Linear Actuation: A State of the Art Review”, International Journal of Fluid Power, 2020, vol. 21, No. 2, pp. 263-304.
Heybroek, Kim, and Erik Norlin, “Hydraulic Multi-Chamber Cylinders in Construction Machinery”, Hydraulikdagarna, Linköping, Sweden, Mar. 16-17, 2015.
Heybroek, Kim, and Johan Sjöberg, “Model Predictive Control of a Hydraulic Multichamber Actuator: A Feasibility Study”, IEEE/ASME Transactions on Mechatronics, vol. 23, No. 3, Jun. 2018, pp. 1393-1403.
Heybroek, Kim, “On Energy Efficient Mobile Hydraulic Systems with Focus on Linear Actuation”, Linköping Studies In Science and Technology Dissertations, No. 1857, 2017.
Niemi-Pynttäri, Olli et al., “Parallel Pump-Controlled Multi-Chamber Cylinder”, Proceedings of the ASME/BATH 2014 Symposium on Fluid Power & Motion Control, 2014.
Vukovic, Milos, “Hydraulic Hybrid Systems for Excavators”, Shaker Verlag, vol. 90, 2017.

* cited by examiner

HYDRAULIC APPARATUS AND METHOD FOR A VEHICLE

FIELD OF THE INVENTION

The present invention relates to a vehicle having a hydraulic work function, to a controller for a vehicle, and to a method of controlling a vehicle.

BACKGROUND TO THE INVENTION

Vehicles having work functions can have at least some of their work functions driven using hydraulic systems.

Hydraulic fluid is moved in or out of one or more hydraulic actuators using a hydraulic pump in combination with one or more valves.

In one example, hydraulic fluid is pumped into an actuator chamber of a hydraulic actuator to drive a work function using the hydraulic pump. When hydraulic fluid is to be moved out of the actuator chamber of the hydraulic actuator, this can be achieved through release of the pressurised hydraulic fluid through a throttle valve into a low-pressure system, such as a tank at atmospheric pressure. This may be referred to as throttling.

Where there are multiple hydraulic actuators having different operating pressures, the hydraulic pump typically operates to supply hydraulic fluid at the maximum of any of the operating pressures, with the required pressure drop being achieved through throttling.

It is also known to supply hydraulic fluid from a variable pump, in which the output pressure of the hydraulic fluid can be controlled.

In some examples, a hydraulic accumulator can be included to allow pressurised hydraulic fluid from the hydraulic actuators to be stored, and later re-used, providing an energy recovery functionality.

It is in this context that the present inventions have been devised.

SUMMARY OF THE INVENTION

In accordance with an aspect of the present invention, there is provided a vehicle having a hydraulic work function. The vehicle comprises: a prime mover; a hydraulic fluid manifold; and a hydraulic machine in fluid communication with the hydraulic fluid manifold. The hydraulic machine has a rotatable shaft in driven engagement with the prime mover, and is configured such that, in operation, the hydraulic machine exchanges hydraulic fluid with the hydraulic fluid manifold by movement of the rotatable shaft. The vehicle further comprises: a hydraulic accumulator in fluid communication with the hydraulic fluid manifold and for exchanging hydraulic fluid with the hydraulic fluid manifold; and one or more hydraulic actuators, the one or more hydraulic actuators together having at least two actuator chambers in fluid communication with the hydraulic fluid manifold. The one or more hydraulic actuators are configured to be used in the hydraulic work function. The vehicle further comprises a valve arrangement configured to selectively control fluid communication between at least one of the at least two actuator chambers and the hydraulic accumulator, via the hydraulic fluid manifold. The valve arrangement is further configured to selectively control fluid communication between at least one of the at least two actuator chambers and the hydraulic machine, via the hydraulic fluid manifold. The vehicle further comprises a controller configured to: receive an actuator demand signal indicative of a demand to move the one or more hydraulic actuators; and control the hydraulic machine and the valve arrangement to cause movement of the one or more hydraulic actuators in accordance with the actuator demand signal. To cause the movement of the one or more hydraulic actuators in accordance with the actuator demand signal, the hydraulic machine and the valve arrangement are controlled to bring the hydraulic accumulator into fluid communication with a first actuator chamber of the at least two actuator chambers, via a first portion of the hydraulic fluid manifold and the valve arrangement, and to synchronise therewith, a change in pressure in a second actuator chamber of the at least two actuator chambers. The second actuator chamber is in fluid communication with the hydraulic machine via a second portion of the hydraulic fluid manifold and the valve arrangement.

Thus, a vehicle can be provided in which the hydraulic work function having the one or more hydraulic actuators is operated with the advantages of precise control provided by the hydraulic machine, and with the advantage of high loads provided by the hydraulic accumulator, thereby overcoming the disadvantages of each respective way of providing hydraulic fluid exchange with the at least two actuator chambers of the one or more hydraulic actuators, which would otherwise apply where only one of the hydraulic machine and the hydraulic accumulator were connected to the actuator chambers of the one or more hydraulic actuators. Whilst hydraulic machines allow precise control of fluid flow rate and pressure, the maximum pressure which can be provided is limited by the available capacity of the hydraulic machine. Similarly, whilst use of hydraulic accumulators allow rapid control of force to be applied by the actuator, the force to be applied cannot be finely controlled, without use of throttling valves, which can significantly reduce the energy efficiency of the system. By providing at least two actuator chambers for the one or more hydraulic actuators, both the hydraulic machine and the hydraulic accumulator can be used to meet the movement demands of the one or more hydraulic actuators used in the hydraulic work function.

The present invention extends to a controller for a vehicle having a hydraulic work function. The controller is typically configured as described hereinbefore with reference to the vehicle. Specifically, the controller is configured to: receive an actuator demand signal indicative of a demand to move one or more hydraulic actuators to be used in the hydraulic work function; and control a hydraulic machine and a valve arrangement of the vehicle to cause movement of the one or more hydraulic actuators in accordance with the actuator demand signal. To cause the movement of the one or more hydraulic actuators in accordance with the actuator demand signal, the hydraulic machine and the valve arrangement are controlled to bring a hydraulic accumulator of the vehicle into fluid communication with a first actuator chamber of the at least two actuator chambers, via a first portion of a hydraulic fluid manifold of the vehicle and the valve arrangement, and to synchronise therewith, a change in pressure of a second actuator chamber of the at least two actuator chambers, the second actuator chamber in fluid communication with the hydraulic machine via a second portion of the hydraulic fluid manifold and the valve arrangement.

Thus, in examples, the controller alone can provide at least one of the inventive concepts described herein.

The controller may comprise one or more processors and a memory configured to store instructions which when executed by the one or more processors cause the vehicle to carry out the functions of the controller described herein. The memory may be non-transitory, computer readable memory. The memory may have the instructions stored thereon. The present invention extends to a non-transitory computer-readable medium (e.g. memory) having the instructions stored thereon to control the vehicle as described herein. The memory may be solid-state memory. The controller may be provided in a single device. In other example, the controller may be distributed, having a plurality of processors. A first processor may be separated from a second processor in a distributed manner.

Viewed from another aspect, there is provided a method of controlling a vehicle to operate as the controller is configured.

The vehicle may typically be configured to use the one or more hydraulic actuators to perform the hydraulic work function. The vehicle may be a loader, for example a wheel loader.

It will be understood that a hydraulic accumulator is substantially any store of hydraulic fluid, suitable for storing energy in the form of pressurised hydraulic fluid. The pressure of the hydraulic fluid stored within the accumulator is typically greater than atmospheric pressure.

It will be understood that the hydraulic fluid manifold is typically formed as pipework, and in particular may be any collection of conduits through which there is provided a fluid communication pathway between the other hydraulic components of the vehicle.

It may be that to synchronise a change in pressure in the second actuator chamber with bringing the hydraulic accumulator into fluid communication with the first actuator chamber, the valve arrangement is controlled to bring the second actuator chamber into fluid communication with the hydraulic actuator at substantially the same time as (e.g. within one second of, such as within 0.5 seconds of) bringing the hydraulic accumulator into fluid communication with the first actuator chamber. Thus, both operations are linked and occur at a similar, if not the same, time.

The hydraulic machine typically defines a plurality of working chambers, each in fluid communication with the hydraulic fluid manifold. Each working chamber may be defined partially by an interior surface of a cylinder, and a movable working surface, mechanically coupled to the rotatable shaft. Typically, the movable working surface is a surface of the piston, in a piston-cylinder pair. A volume of each working chamber may vary cyclically with each rotation of the rotatable shaft. In this way, it will be understood that energy is exchanged between the hydraulic fluid in the hydraulic fluid manifold and the prime mover by movement of one or more of the movable working surfaces and the rotatable shaft. Typically, the energy is exchanged by exchanging hydraulic fluid with the hydraulic fluid manifold by movement of the rotatable shaft.

The invention may relate particularly to electronically commutated hydraulic machines which intersperse active cycles of working chamber volume, where there is a net displacement of hydraulic working fluid, with inactive cycles of working chamber volume, where there is no net displacement of hydraulic working fluid between the working chamber and the hydraulic circuit. Typically, the majority or all of the active cycles are full stroke cycles, in which the working chambers displace a predetermined maximum displacement of working fluid by suitable control of the timing of valve actuation signals. It is also known to regulate low- and optionally high-pressure valves of one or more of the plurality of working chambers to regulate the fraction of maximum displacement made during an active cycle by operating so-called part stroke cycles.

The controller may be configured (e.g. programmed) to control the low and optionally high-pressure valves of the working chambers to cause each working chamber to carry out either an active or an inactive cycle of working chamber volume during each cycle of working chamber volume.

By 'active cycles' we refer to cycles of working chamber volume which make a net displacement of working fluid. By 'inactive cycles' we refer to cycles of working chamber volume which make no net displacement of working fluid (typically where one or both of the low-pressure valve and high-pressure valve remain closed throughout the cycle). Typically, active and inactive cycles are interspersed to meet the demand indicated by the demand signal. This contrasts with machines which carry out only active cycles, the displacement of which may be varied.

The demand signal for one or more working chambers of the hydraulic machine is typically processed as a 'displacement fraction', Fd, being a target fraction of maximum displacement of working hydraulic fluid per rotation of the rotatable shaft. A demand expressed in volumetric terms (volume of working hydraulic fluid per second) can be converted to displacement fraction taking into account the current speed of rotation of the rotatable shaft and the number of working chambers connected in a group to the same high-pressure manifold and one or more hydraulic components (e.g. the one or more hydraulic actuators and one or more further hydraulic components) of the hydraulic apparatus. The demand signal relates to a demand for the combined fluid displacement of the group of one or more working chambers fluidly connected to the said one or more hydraulic components of the vehicle via the hydraulic fluid manifold. There may be other groups of one or more working chambers fluidically connected to one or more other hydraulic components having respective demand signals.

It may be that at least the low-pressure valves (optionally the high-pressure valves, optionally both the low-pressure valves and the high-pressure valves) are electronically controlled valves, and the controller or a further controller is configured to control the (e.g. electronically controlled) valves in phased relationship with cycles of working chamber volume to thereby determine the net displacement of hydraulic fluid by each working chamber on each cycle of working chamber volume. The method may comprise controlling the (e.g. electronically controlled) valves in phased relationship with cycles of working chamber volume to thereby determine the net displacement of hydraulic fluid by each working chamber on each cycle of working chamber volume.

Groups of one or more working chambers may be dynamically allocated to respective groups of one or more hydraulic components in fluid communication with the hydraulic fluid manifold (e.g. the one or more hydraulic actuators and/or the hydraulic accumulator and/or one or more further hydraulic components) to thereby change which one or more working chambers are connected to (e.g. a group of) hydraulic components, for example by opening or closing electronically controlled valves (e.g. high-pressure valves and low-pressure valves, described herein), e.g. under the control of a controller. Groups of (e.g. one or more) working chambers may be dynamically allocated to (respective) groups of (e.g. one or more) hydraulic components to thereby change which working chambers of the machine are coupled to which hydraulic components, for example by opening and/or closing (e.g. electronically controlled) valves, e.g. under the control of the or a further controller. The net displacement of hydraulic fluid through each working chamber (and/or each hydraulic component) can be regulated by regulating the net displacement of the working chamber or chambers which are connected to the hydraulic component or components. Groups of one or more working chambers are typically connected to a respective group of one or more said hydraulic components through a said hydraulic fluid manifold or a portion thereof.

It may be that the rate of flow of hydraulic fluid accepted by, or output by, each working chamber is independently controllable. It may be that the flow of hydraulic fluid accepted by, or produced by, each working chamber can be independently controlled by selecting the net displacement of hydraulic fluid by each working chamber on each cycle of working chamber volume. This selection is typically carried out by the controller.

Typically, the hydraulic machine is operable as a pump, in a pump operating mode or is operable as a motor in a motor operating mode. It may be that some of the working chambers of the hydraulic machine may pump (and so some working chambers may output hydraulic fluid) while other working chambers of the hydraulic machine may motor (and so some working chambers may input hydraulic fluid).

The hydraulic machine may be a pump, or motor, or pump-motor (possibly variable displacement), or a digital displacement pump-motor. Due to the high efficiency of digital displacement pump-motors particularly at part load, the transfer of energy between the hydraulic machine and the one or more hydraulic actuators is also particularly efficient, and more efficient than alternative technologies. It will further be understood that digital displacement pump-motors are particularly suited to this application due to the fast, accurate and independent control of pressure and flow that is possible.

It will be understood that the valve arrangement may comprise substantially any valves which can affect a fluid flow characteristic of hydraulic fluid flowing between hydraulic components via the hydraulic fluid manifold, such as a pressure, a flow rate, or a route of the hydraulic fluid through the hydraulic fluid manifold. Typically, the valve arrangement comprises a plurality of routing valves. It will be understood that controlling at least one of the plurality of routing valves will still be understood to be controlling the valve arrangement. Each of the valves of the valve arrangement may be electronically controllable to permit or substantially prevent fluid flow between a first side and a second side of the valve. In some examples, at least some of the valves may be multiway valves in which hydraulic fluid can be routed to only one of a plurality of valve outlets at a time. The valve arrangement may be configured to independently control fluid communication between each of the at least two actuator chambers and the hydraulic accumulator, via the hydraulic fluid manifold. The valve arrangement may be configured to independently control fluid communication between each of the at least two actuator chambers and the hydraulic machine, via the hydraulic fluid manifold.

The valve arrangement may comprise: one or more actuator chamber valves each associated with, of the at least two actuator chambers, only a respective one actuator chamber. Thus, the actuator chamber valves can be used to bring the actuator chambers into fluid communication with one or more portions of the hydraulic fluid manifold. In examples, an actuator chamber valve may be in fluid communication with a respective actuator chamber at one side, and configured to allow selective routing of hydraulic fluid between the respective actuator chamber and a plurality of different portions of the hydraulic fluid manifold at a second side. The plurality of different portions of the hydraulic fluid manifold may comprise an accumulator portion, in fluid communication with the hydraulic accumulator, and a hydraulic machine portion in fluid communication with the hydraulic machine.

The valve arrangement may comprise a manifold valve group, in a fluid communication pathway within the hydraulic manifold, between the one or more actuator chamber valves and the hydraulic machine. The manifold valve group may comprise a plurality of independently controllable valves. Thus, the manifold valve group may allow a routing of hydraulic fluid from the hydraulic machine to be controlled. The hydraulic machine portion of the hydraulic fluid manifold may be in fluid communication with the hydraulic machine via the manifold valve group. The accumulator portion of the hydraulic fluid manifold may be in fluid communication with the hydraulic accumulator via a portion of the hydraulic fluid manifold not including the manifold valve group.

The one or more hydraulic actuators may comprise a first hydraulic actuator having the first actuator chamber and the second actuator chamber. Indeed, in some examples, the one or more hydraulic actuators having the first actuator chamber and the second actuator chamber, and to be used in the hydraulic work function, may be only a single hydraulic actuator. In other examples, the one or more hydraulic actuators may be a plurality of hydraulic actuators, such as two hydraulic actuators.

An effective working area of the first actuator chamber of the one or more hydraulic actuators may be different to an effective working area of a second actuator chamber of the one or more hydraulic actuators. The effective working area of the first actuator chamber may be greater than the effective working area of the second actuator chamber. The effective working area of the first actuator chamber may be less than the effective working area of the second actuator chamber.

At least the first actuator chamber may be incapable of being in fluid communication with the hydraulic machine, via a fluid communication pathway separate to the hydraulic accumulator. In other words, of the hydraulic machine and the hydraulic accumulator, the first actuator chamber is only in fluid communication with the hydraulic accumulator, other than via a fluid communication pathway also including the hydraulic accumulator. Thus, the hydraulic fluid manifold may be kept simpler than where the first actuator chamber can be brought directly into fluid communication with the hydraulic machine (via a fluid communication pathway separate to the hydraulic accumulator). Similarly, the second actuator chamber may be incapable of being in fluid communication with the hydraulic accumulator, via a fluid communication pathway separate to the hydraulic machine. Thus, the hydraulic fluid manifold may be kept simpler than where the second actuator chamber can be brought directly into fluid communication with the hydraulic accumulator (via a fluid communication pathway separate to the hydraulic machine).

The hydraulic accumulator may be a first hydraulic accumulator, and the vehicle may comprise a plurality of hydraulic accumulators, including the first hydraulic accumulator. The first hydraulic accumulator may contain hydraulic fluid at a first pressure. The plurality of hydraulic accumulators may comprise a second hydraulic accumulator containing hydraulic fluid at a second pressure, different to the first pressure. Thus, hydraulic fluid at different pressures can be brought into fluid communication with the first actuator chamber to best meet the demand to move the plurality of hydraulic actuators. The controller may be configured to control the valve arrangement to bring the second hydraulic accumulator into fluid communication with the first actuator chamber, and to synchronise therewith, to isolate the first hydraulic accumulator from the first actuator chamber. Thus, the hydraulic accumulator in fluid communication with the first actuator chamber can be switched as necessary. The plurality of hydraulic accumulators may be at least three hydraulic accumulators, each arranged to contain hydraulic fluid at a different respective pressure. At least one of the hydraulic accumulators may be configured to contain hydraulic fluid at a pressure less than 10 bar in use. At least one of the hydraulic accumulators may be configured to contain hydraulic fluid at a pressure greater than 10 megapascals in use. At least one of the hydraulic accumulators may be configured to contain hydraulic fluid at a pressure greater than 20 megapascals in use.

When the hydraulic accumulator(s) are not in fluid communication with the actuator chambers of the one or more hydraulic actuators, the valve arrangement and the hydraulic machine may be controlled to bring one or more of the hydraulic accumulator(s) into fluid communication with the hydraulic machine to exchange hydraulic fluid between the hydraulic fluid manifold and the one or more hydraulic accumulator(s) to alter a pressure of the hydraulic fluid stored within the one or more hydraulic accumulators to be closer to a default operating pressure of the one or more hydraulic accumulators.

The hydraulic machine may comprise a plurality of pump groups, each comprising a plurality of working chambers in fluid communication with the hydraulic fluid manifold. Each working chamber may be defined partially by a movable working surface mechanically coupled to the rotatable shaft. The controller may be configured to control at least one of the pump groups differently to at least one other of the pump groups. It may be that in a first configuration, the working chambers of at least one of the pump groups are in fluid communication with a first hydraulic component (e.g. the second actuator chamber of the one or more hydraulic actuators). In a second configuration, the working chambers of at least one of the at least one of the pump groups remain in fluid communication with the first hydraulic component, while the working chambers of at least one other of the at least one of the pump groups are in fluid communication with a second hydraulic component (e.g. the hydraulic accumulator). Thus, the pump groups can be dynamically split, joined and re-allocated as necessary to meet the hydraulic demands of the hydraulic components of the vehicle.

The controller may be configured to control the valve arrangement to bring at least one of the pump groups into fluid communication with the first portion of the hydraulic fluid manifold in a first configuration, and with the second portion of the hydraulic fluid manifold in a second configuration. It may be that a plurality of the pump groups are in fluid communication with the first portion of the hydraulic fluid manifold. It may be that a plurality of the pump groups are in fluid communication with the second portion of the hydraulic fluid manifold. The controller may be configured to control the valve arrangement to bring at least one of the pump groups into fluid communication with a third portion of the hydraulic fluid manifold, the third portion being in fluid communication with at least one further hydraulic actuator, separate to the one or more hydraulic actuators. Thus, the hydraulic machine can be used to exchange hydraulic fluid with multiple hydraulic actuators as necessary to meet a demand from multiple respective hydraulic actuators (or other hydraulic components).

The vehicle may be for performing a plurality of hydraulic work functions.

At least one of the hydraulic work functions may be performed using a further hydraulic actuator having at least one actuator chamber configured to be always in fluid communication with the hydraulic machine. Thus, it may be that one or more pump groups of the hydraulic machine are dedicated to other hydraulic actuators. In this way, the hydraulic fluid manifold and the valve arrangement can be kept simpler than if each pump group could be connected independently to multiple different hydraulic components, such as multiple different hydraulic actuators.

The hydraulic machine may be configured to be always in fluid communication with the hydraulic actuator or a given hydraulic actuator of the one or more hydraulic actuators. Thus, it may be that one or more pump groups of the hydraulic machine are dedicated to a particular hydraulic actuator of the one or more hydraulic actuators, simplifying the hydraulic fluid manifold and/or the valve arrangement. The hydraulic machine may be configured to be always in fluid communication with a given actuator chamber of the given hydraulic actuator.

The one or more hydraulic actuators may comprise more than two actuator chambers, such as at least four actuator chambers.

The controller may be configured to control the hydraulic machine and the valve arrangement to cause exchange of hydraulic fluid from the hydraulic fluid manifold to the hydraulic accumulator. Thus, energy can be stored in the hydraulic accumulator by causing hydraulic fluid to be received therein. It may be that the energy to be stored in the hydraulic accumulator originates from a lowering movement of the hydraulic work function. For example, the one or more hydraulic actuators may be brought into direct fluid communication with the hydraulic accumulator during a lowering movement of the hydraulic work function, so that energy released from the one or more hydraulic actuators by lowering of the hydraulic work function can be stored in the hydraulic accumulator. In other examples, the one or more hydraulic actuators may be brought into fluid communication with at least one first pump group of the hydraulic machine, and at least one second pump group of the hydraulic machine may be brought into fluid communication with the hydraulic accumulator. In this way, energy released from the one or more hydraulic actuators by lowering of the hydraulic work function can be transferred to the rotatable shaft by the hydraulic machine, and then used to pump hydraulic fluid using at least one second pump group of the hydraulic machine to cause hydraulic fluid to be passed into the hydraulic accumulator. Thus, the hydraulic accumulator can be charged even where the pressure is different to the pressure of the hydraulic fluid being passed out of the one or more hydraulic actuators during the lowering movement of the hydraulic work function.

The hydraulic accumulator may be provided in fluid communication between the hydraulic machine and the valve arrangement.

At least two fluid communication pathways may be provided from a high-pressure side of the hydraulic machine to the valve arrangement. It may be that each of the at least two fluid communication pathways connects to a separate pump group of the hydraulic machine.

A low-pressure side of the hydraulic machine may be in fluid communication with the one or more hydraulic actuators via the valve arrangement. Thus, hydraulic fluid can be controllably routed from the one or more hydraulic actuators to the low-pressure reservoir (also connected to the low-pressure side of the hydraulic machine). The low-pressure side of the hydraulic machine may be in fluid communication with the one or more hydraulic actuators via the actuator chamber valves of the valve arrangement. The low-pressure side of the hydraulic machine may be in fluid communication with the one or more hydraulic actuators via the manifold valve group of the valve arrangement.

The actuator demand signal may be indicative (e.g. representative) of a flow demand or a velocity demand in relation to the hydraulic work function. In other words, the actuator demand signal may be determined depending on a velocity demand for movement of the hydraulic work function. The actuator demand signal may be determined depending on a flow demand for movement of the hydraulic work function.

The controller may be configured to control the hydraulic machine and the valve arrangement depending on an error between a measured parameter of the one or more hydraulic actuators and a demanded value for the parameter of the one or more hydraulic actuators. Thus, the hydraulic machine and the valve arrangement can be controlled using a closed-loop control system. The parameter may be chosen from the list of: position, velocity, pressure, force, flow-rate, power. In other examples, the hydraulic machine and the valve arrangement may be controlled based on a demanded value of a parameter, without feedback from a measured value of the parameter. In other words, the controller may be configured to control the hydraulic machine and the valve arrangement as an open-loop control system.

The controller may be configured to determine a demanded force parameter of the actuator depending on a demand to move the one or more hydraulic actuators with a given velocity. The controller may be configured to control the hydraulic machine and the valve arrangement to cause movement of the one or more hydraulic actuators depending on the demanded force parameter.

The demand to move the one or more hydraulic actuators may be determined from a user input. The user input may be a joystick controller. Thus, the movement of the one or more hydraulic actuators can be easily and manually controlled by a user.

The hydraulic work function may include at least one of a boom and a bucket. A plurality of hydraulic work functions of the vehicle may include a boom and a bucket. It may be that at least one other of the hydraulic work functions may be isolated from the hydraulic accumulator, but selectively fluidly connected to the hydraulic machine. Thus, some of the hydraulic work functions can be operated using the hydraulic machine alone, without using the hydraulic accumulator(s). The at least one other of the hydraulic work functions may include a swing work function.

The one or more hydraulic actuators may be arranged such that an expansion in a volume of the first actuator chamber corresponds to a reduction in a volume of the second actuator chamber. In other words, the first actuator chamber and the second actuator chamber may each represent different sides of a double-acting ram.

The present invention extends to a method for controlling a vehicle having a hydraulic work function. The method comprises: receiving a demand to move one or more hydraulic actuators to be used in the hydraulic work function; and controlling a hydraulic machine and a valve arrangement to bring a hydraulic accumulator of the vehicle into fluid communication with a first actuator chamber of the one or more hydraulic actuators, via a hydraulic fluid manifold of the vehicle and the valve arrangement, and synchronised therewith, changing a pressure in a second actuator chamber of the one or more hydraulic actuators. The second actuator chamber is in fluid communication with the hydraulic machine via the hydraulic fluid manifold and the valve arrangement. Controlling the hydraulic machine and the valve arrangement as described thereby causes movement of the hydraulic actuator in accordance with the demand.

The method may comprise any of the functions described in relation to the vehicle or the controller as described elsewhere herein. The hydraulic machine, the hydraulic accumulator, the hydraulic fluid manifold, the one or more hydraulic actuators and the valve arrangement may each have any of the features described elsewhere herein.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
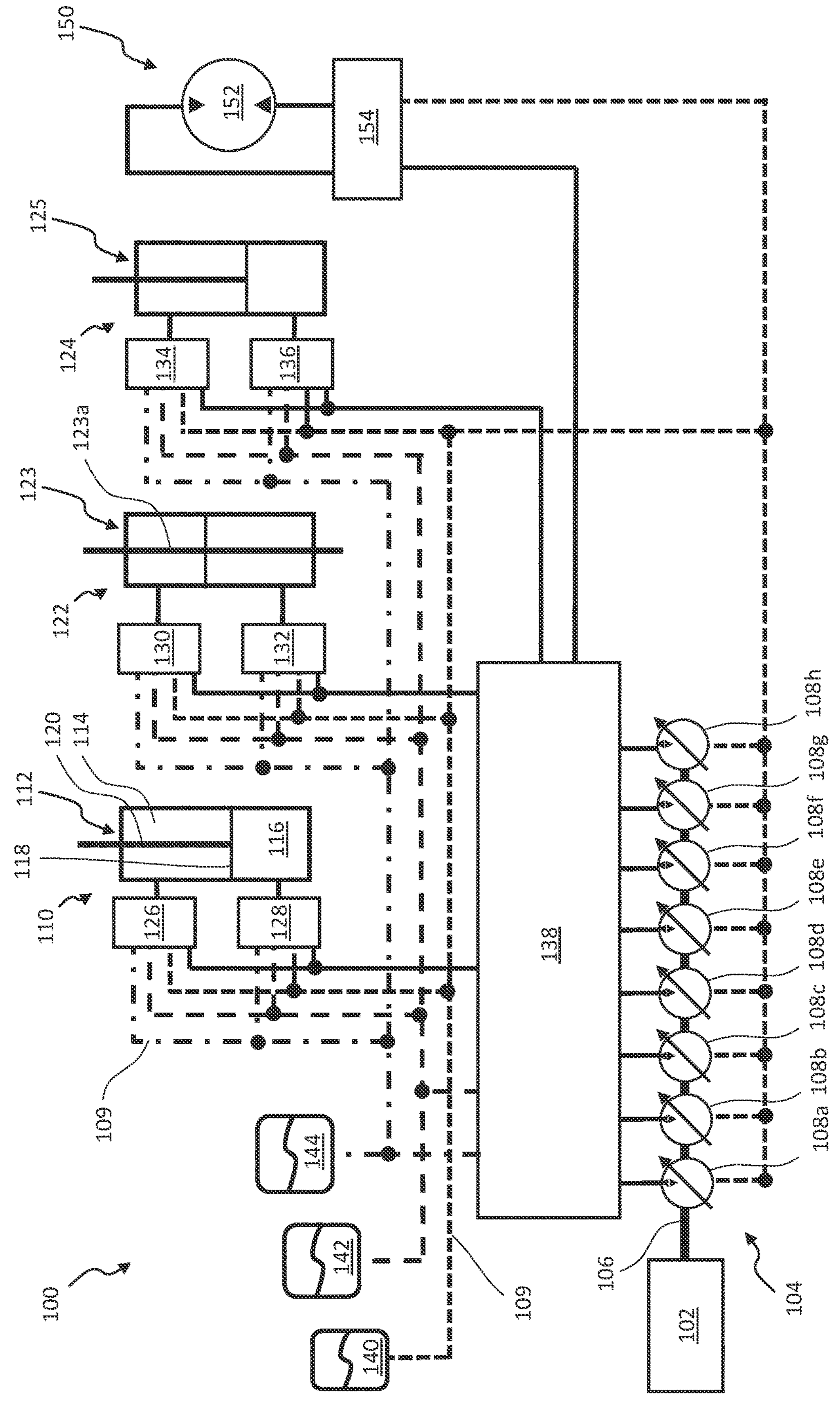
FIG. 1 is a schematic illustration of an example of hydraulic apparatus as described herein.

FIG. 1 is a schematic illustration of an example of hydraulic apparatus for use in a vehicle, as described herein. The vehicle is a loader, such as an excavator. The hydraulic apparatus 100 comprises a prime mover 102 and a hydraulic machine 104. The hydraulic machine 104 has a rotatable shaft 106 in driven engagement with the prime mover 102. In this example, the hydraulic machine 104 defines a plurality of groups of working chambers, specifically eight groups of working chambers, sometimes referred to as chamber groups **108*a*, 108*b*, 108*c*, 108*d*, 108*e*, 108*f*, 108*g*, 108*h*. The detailed operation of the hydraulic machine 104, and in particular the groups of working chambers 108*a*, 108*b*, 108*c*, 108*d*, 108*e*, 108*f*, 108*g*, 108*h* will be explained further with reference to FIG. 4 hereinafter. Although not shown in FIG. 1, it will be understood that each group of working chambers 108*a*, 108*b*, 108*c*, 108*d*, 108*e*, 108*f*, 108*g*, 108*h* typically comprises a plurality of working chambers in a hydraulic circuit, each working chamber being defined partially by a movable working surface mechanically coupled to the rotatable shaft 106 such that, in operation, the hydraulic machine 104 exchanges energy with the hydraulic circuit and the prime mover 102 by movement of the working surfaces and the rotatable shaft 106. The hydraulic machine 104 exchanges energy with the hydraulic circuit by exchange of hydraulic fluid between the hydraulic circuit and the hydraulic machine 104, and exchanges energy between the prime mover 102 and the hydraulic machine 104 by movement of the rotatable shaft 106**.

It will be understood that the hydraulic circuit is defined by any portions of the hydraulic apparatus 100 through which hydraulic fluid can flow and which are in or can be brought into fluid communication with any of the working chambers of the hydraulic machine 104. The one or more components of the hydraulic apparatus 100 forming the hydraulic circuit are referred to as a hydraulic fluid manifold 109.

The hydraulic apparatus 100 comprises a first hydraulic work function 110, in this example a boom lifting work function 110. The boom lifting work function 110 uses at least one hydraulic actuator 112, the (or each) hydraulic actuator 112 in the form of a double-acting cylinder ram to raise or lower a boom of an excavator arm of the loader vehicle. The hydraulic actuator 112 comprises a first actuator chamber 114 and a second actuator chamber 116. Each of the first actuator chamber 114 and the second actuator chamber 116 are in fluid communication with at least a portion of the hydraulic fluid manifold 109. The first actuator chamber 114 and the second actuator chamber 116 are separated by a piston 118 having a rod 120 extending therefrom through the second actuator chamber 116 of the hydraulic actuator 112. The rod 120 is mechanically connected to a boom (not shown in FIG. 1), such that movement of one of the rod 120 of the hydraulic actuator 112 and the boom causes movement of the other of the rod 120 of the hydraulic actuator 112 and the boom. The effective working area of the first actuator chamber 114 is less than the effective working area of the second actuator chamber 116.

In this example, the hydraulic apparatus 100 comprises further hydraulic work functions 122, 124, specifically a second hydraulic work function 122 in the form of a stick work function 122 for moving a stick portion of the excavator arm of the loader vehicle, and a third hydraulic work function 124 in the form of a bucket work function 124 to move a bucket of the excavator arm of the loader vehicle. Each of the further hydraulic work functions 122, 124 includes one or more further hydraulic actuators, as illustrated in FIG. 1. In this example, the second hydraulic work function 122 comprises a second hydraulic actuator 123 having a rod 123*a* extending through both sides of the second hydraulic actuator 123. The third hydraulic work function 124 comprises a third hydraulic actuator 125, similar in configuration to the hydraulic actuator 112 of the first hydraulic work function 110, but of a smaller size in this example.

The hydraulic apparatus 100 further comprises three energy storage components in the form of three hydraulic accumulators 140, 142, 144. The hydraulic accumulators 140, 142, 144 are each separately in fluid communication with the hydraulic fluid manifold 109, and are configured to exchange hydraulic fluid therewith. A first hydraulic accumulator 140 is a low-pressure hydraulic accumulator 140, for example configured to store hydraulic fluid at a pressure of approximately 300 kilopascals. A second hydraulic accumulator 142 is a medium-pressure hydraulic accumulator 142, for example configured to store hydraulic fluid at a pressure of approximately 15 megapascals. A third hydraulic accumulator 144 is a high-pressure hydraulic accumulator 144, for example configured to store hydraulic fluid at a pressure of approximately 30 megapascals. In this example, the low-pressure hydraulic accumulator 140 is in fluid communication with a low-pressure side of the hydraulic machine 104, specifically a low-pressure side of each of the groups of working chambers 108*a*, 108*b*, 108*c*, 108*d*, 108*e*, 108*f*, 108*g*, 108*h* of the hydraulic machine 104.

The hydraulic apparatus 100 further comprises a further hydraulic work function 150, in this example for performing a rotational swing operation of an excavator arm to rotate the excavator arm about a vertical axis, typically near a cab of the vehicle. The further hydraulic work function 150 is performed using a hydraulic motor 152 for converting hydraulic fluid pressure and flow into rotational movement of a shaft (not shown in FIG. 1). A directional control valve 154 is provided in fluid communication with both sides of the hydraulic motor 152 to control a direction of rotation of the hydraulic motor 152, to thereby control a direction of swing of the excavator arm. The directional control valve 154 is also in fluid communication with the low-pressure hydraulic accumulator 140.

The hydraulic apparatus 100 further comprises a valve arrangement made up of a plurality of actuator chamber valves 126, 128, 130, 132, 134, 136 and a manifold valve group 138, in the form of a ganging arrangement 138. The valves of the valve arrangement are together configured to selectively control fluid communication between any one or more of the actuator chambers of the hydraulic actuators and one or more of the hydraulic accumulators 140, 142, 144, via the hydraulic fluid manifold 109. The valves of the valve arrangement are also together configured to selectively control fluid communication between one or more of the actuator chambers of the hydraulic actuators and the hydraulic machine 104, via the hydraulic fluid manifold 109.

The actuator chamber valves 126, 128, 130, 132, 134, 136 are each arranged at an outlet of a respective one of the hydraulic chambers of the hydraulic actuators in the hydraulic work functions 110, 122, 124. The actuator chamber valves 126, 128, 130, 132, 134, 136 are sometimes referred to as switching valves. Each actuator chamber valve 126, 128, 130, 132, 134, 136 comprises a single port at a first side, in fluid communication with a hydraulic chamber of a hydraulic actuator of a hydraulic work function, and a plurality of ports, in this example four ports, at a second side. A first port of the plurality of ports is in fluid communication with the first hydraulic accumulator 140. A second port of the plurality of ports is in fluid communication with the second hydraulic accumulator 142. A third port of the plurality of ports is in fluid communication with the third hydraulic accumulator 144. A fourth port of the plurality of ports is in fluid communication with the manifold valve group and typically with at least one of the groups of working chambers 108*a*, 108*b*, 108*c*, 108*d*, 108*e*, 108*f*, 108*g*, 108*h* of the hydraulic machine 104. Each actuator chamber valve 126, 128, 130, 132, 134, 136 can be independently controlled to bring the respective hydraulic chamber of the hydraulic actuators 112, 123, 125 into fluid communication with typically exactly one of the first hydraulic accumulator 140, the second hydraulic accumulator 142, the third hydraulic accumulator 144 and the hydraulic machine 104. The actuator chamber valves 126, 128, 130, 132, 134, 136 are provided in pairs, one pair for each of the hydraulic actuators 112, 123, 125. Specifically, a first pair of actuator chamber valves is provided by a first actuator chamber valve 126 fluidly connected to the first actuator chamber 114 of the hydraulic actuator 112 and a second actuator chamber valve 128 fluidly connected to the second actuator chamber 116 of the same hydraulic actuator 112. Similarly, a second pair of actuator chamber valves is provided by a third actuator chamber valve 130 and a fourth actuator chamber valve 132, respectively connected to first and second actuator chambers of the second hydraulic actuator 123. A third pair of actuator chamber valves is provided by a fifth actuator chamber valve 134 and a sixth actuator chamber valve 136, respectively connected to first and second actuator chambers of the third hydraulic actuator 125. In each pair of actuator chamber valves, typically only one of the actuator chamber valves can connect the actuator chambers to a given hydraulic component, via the hydraulic fluid manifold.

The ganging arrangement 138 is shown as a conceptual portion of the hydraulic apparatus 100 in FIG. 1. In practice, the ganging arrangement 138 comprises a plurality of valves to control fluid communication routing between a plurality of ports. The ganging arrangement 138 is independently fluidly connected to each of the groups of working chambers 108*a*, 108*b*, 108*c*, 108*d*, 108*e*, 108*f*, 108*g*, 108*h* of the hydraulic machine 104, each pair of actuator chamber valves 126, 128, 130, 132, 134, 136 associated with each hydraulic actuator 112, 123, 125, the medium-pressure hydraulic accumulator 142 and the high-pressure hydraulic accumulator 144, and the directional control valve 154. Thus, in this example, any one or more of the plurality of groups of working chambers 108*a*, 108*b*, 108*c*, 108*d*, 108*e*, 108*f*, 108*g*, 108*h* of the hydraulic machine 104 can be fluidly connected to one of the medium-pressure hydraulic accumulator 142, the high-pressure hydraulic accumulator 144, any one pair of actuator chamber valves 126, 128, 130, 132, 134, 136 associated with each hydraulic actuator 112, 123, 125, and the directional control valve 154. A further one or more of the plurality of groups of working chambers 108*a*, 108*b*, 108*c*, 108*d*, 108*e*, 108*f*, 108*g*, 108*h* of the hydraulic machine 104 can be fluidly connected to a different one of the medium-pressure hydraulic accumulator 142, the high-pressure hydraulic accumulator 144, any one pair of actuator chamber valves 126, 128, 130, 132, 134, 136 associated with each hydraulic actuator 112, 123, 125, and the directional control valve 154. In this way, the ganging arrangement 138 can be controlled to bring the groups of working chambers 108*a*, 108*b*, 108*c*, 108*d*, 108*e*, 108*f*, 108*g*, 108*h* of the hydraulic machine 104 into fluid communication with other hydraulic components of the hydraulic apparatus 100 via the hydraulic fluid manifold 109.

The hydraulic apparatus 100 further comprises a controller (not shown in FIG. 1) configured to control at least the hydraulic machine 104, the actuator chamber valves 126, 128, 130, 132, 134, 136, the ganging arrangement 138, and the directional control valve 154 of the hydraulic apparatus 100. The operation of the controller will be explained further with reference to FIG. 4 hereinafter. It will be understood that in some examples, the hydraulic apparatus 100 can be connected to a separate controller for controlling one or more components of the hydraulic apparatus 100, but can still nevertheless be considered to be hydraulic apparatus 100.

Although not shown in FIG. 1, the hydraulic apparatus 100 also typically includes one or more sensors for measuring flow rate and/or pressure of hydraulic fluid at different points in the hydraulic fluid manifold 109. The hydraulic apparatus 100 further includes one or more sensors for measuring a force exerted by or a movement speed of any of the hydraulic work functions.

In an example, to cause a raising movement of the boom, the ganging arrangement 138 is configured to fluidly connect the first and second groups of working chambers 108*a*, 108*b* to the first pair of actuator chamber valves, including the first actuator chamber valve 126 and the second actuator chamber valve 128, via the ganging arrangement 138. Furthermore, the first actuator chamber valve 126 is configured to bring the first actuator chamber 114 into fluid communication with the portion of the hydraulic fluid manifold 109 in fluid communication with the first and second groups of working chambers 108*a*, 108*b* via the ganging arrangement 138. At the same time, the second actuator chamber valve 128 is configured to bring the second actuator chamber 116 into fluid communication with the high-pressure hydraulic accumulator 144. It will be understood that the high-pressure hydraulic accumulator 144 will supply hydraulic fluid into the second actuator chamber 116 at a pressure substantially corresponding to the pressure of the hydraulic fluid within the high-pressure hydraulic accumulator 144. By controlling a flow rate of hydraulic fluid pumped by the hydraulic machine 104, specifically the first and second groups of working chambers 108*a*, 108*b* of the hydraulic machine 104, towards the first actuator chamber 114, the exact desired lifting force and movement speed of the first hydraulic work function 110 can be achieved. A small change in lifting force and/or movement speed can be easily achieved by modifying the flow rate of the hydraulic fluid pumped by the first and second groups of working chambers 108*a*, 108*b*. Larger changes can be achieved by using a different number of groups of working chambers 108*a*, 108*b*, 108*c*, 108*d*, 108*e*, 108*f*, 108*g*, 108*h* in fluid communication with the first actuator chamber 114, and/or by bringing the second actuator chamber 116 instead into fluid communication with the medium-pressure hydraulic accumulator 142 or even the low-pressure hydraulic accumulator.

In some examples, where the boom is to be lowered, and energy is to be recovered, one or more of the groups of working chambers 108*a*, 108*b*, 108*c*, 108*d*, 108*e*, 108*f*, 108*g*, 108*h* of the hydraulic machine 104 can be brought into fluid communication with the second actuator chamber 116, via the second actuator chamber valve 128, the one or more groups of working chambers configured to operate in a motoring configuration. As described elsewhere herein, the recovered energy can be used to contribute rotational torque to the rotatable shaft 106, which can, for example, be used to pump hydraulic fluid, using one or more other of the groups of working chambers 108*a*, 108*b*, 108*c*, 108*d*, 108*e*, 108*f*, 108*g*, 108*h*, towards at least one of the medium-pressure hydraulic accumulator 142, the high-pressure hydraulic accumulator 144 and any one or more further hydraulic work functions 122, 124, 150; the ganging arrangement 138 is configured to route the hydraulic fluid accordingly. Alternatively, the recovered energy can instead be stored directly in the hydraulic accumulators 142, 144, or used in the further hydraulic work functions 122, 124, 150, without passing via the hydraulic machine 104.

Figure 2:
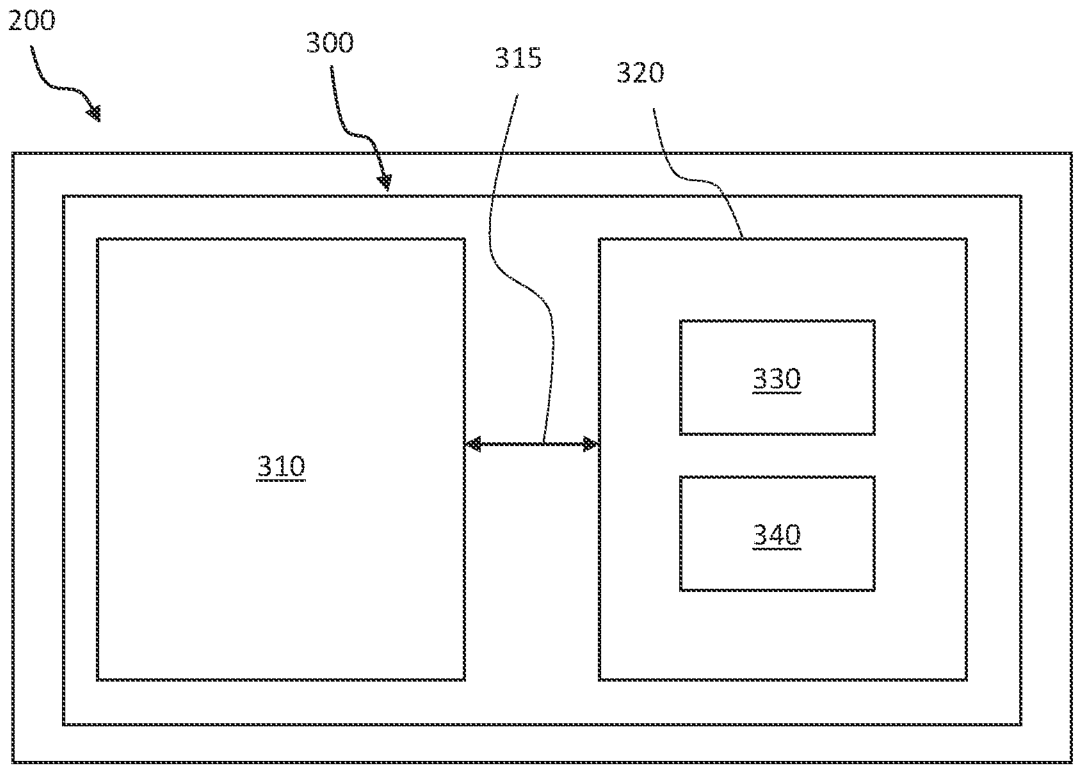
FIG. 2 is a schematic illustration of systems of a vehicle according to an example of the present disclosure.

FIG. 2 is a schematic illustration of systems of a vehicle according to an example of the present disclosure. The vehicle 200 comprises hydraulic apparatus 300 as described herein, including a hydraulic machine 310, and a controller 320. The controller 320 is configured to exchange signals 315 with the hydraulic machine 310 to control the hydraulic apparatus 300 in accordance with input signals received by the controller 320, for example from user inputs by an operator of the vehicle 200. The controller 320 in this example is realised by one or more processors 330 and a computer-readable memory 340. The memory 340 stores instructions which, when executed by the one or more processors 330, cause the hydraulic apparatus 300 to operate as described herein.

Although the controller 320 is shown as being part of the vehicle 200, it will be understood that one or more components of the controller 320, or even the whole controller 320 can be provided separate from the vehicle 200, for example remotely from the vehicle 200, to exchange signals with the vehicle 200 by wireless communication.

Figure 3:
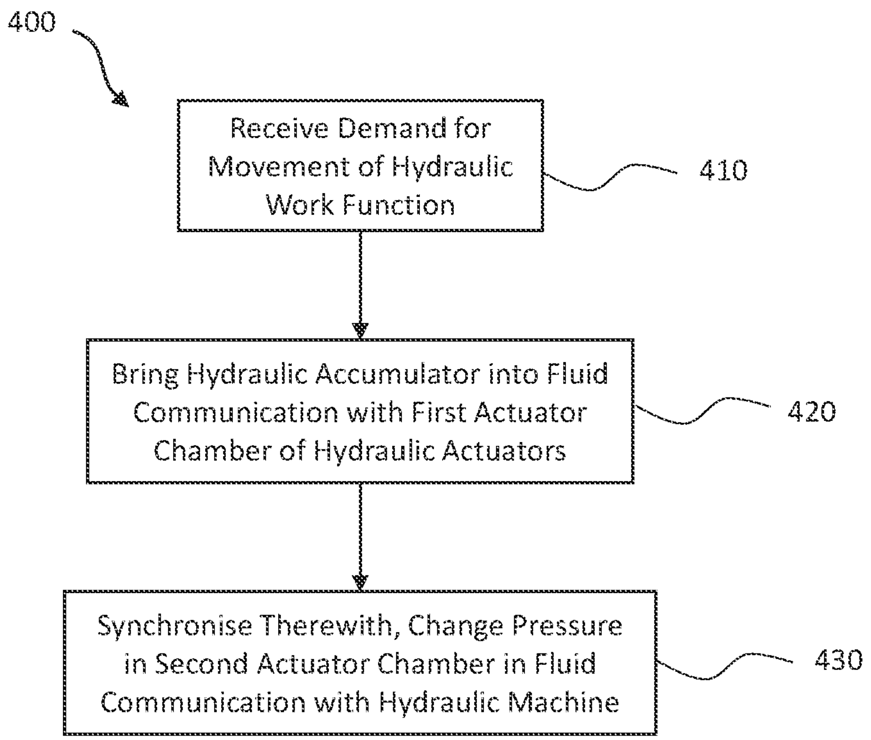
FIG. 3 is a flowchart illustrating a method of controlling a hydraulic machine as described herein.

FIG. 3 is a flowchart illustrating a method of controlling a vehicle as described herein. The method 400 is a method of controlling a vehicle having a hydraulic work function, including a hydraulic machine, to cause movement of hydraulic actuator(s) used in the hydraulic work function.

Specifically, the method 400 comprises receiving 410 a demand to move a plurality of hydraulic actuators to be used in the hydraulic work function. The hydraulic work function is typically a main hydraulic work function of the vehicle, such as a boom lifting work function. The demand is typically in a form of a demand signal receiver from a user input apparatus, such as a control device, for example a joystick.

The method 400 further comprises bringing 420 a hydraulic accumulator of the vehicle into fluid communication with a first actuator chamber of the plurality of hydraulic actuators, via a hydraulic fluid manifold of the vehicle and a valve arrangement. Typically, the valve arrangement is controlled to bring the hydraulic accumulator into fluid communication with the first actuator chamber.

The method 400 further comprises, synchronised therewith, changing 430 a pressure in a second actuator chamber of the hydraulic actuator. The second actuator chamber is in fluid communication with the hydraulic machine via the hydraulic fluid manifold and the valve arrangement. Typically, the hydraulic machine is controlled to change the pressure in the second actuator chamber. If necessary, the valve arrangement can be controlled to bring the second actuator chamber into fluid communication with the hydraulic machine via the hydraulic fluid manifold and the valve arrangement.

As a result of bringing 420 the hydraulic accumulator into fluid communication with the first actuator chamber, and of changing 430 the pressure in the second actuator chamber, the hydraulic actuators are caused to move in accordance with the demand.

Figure 4:
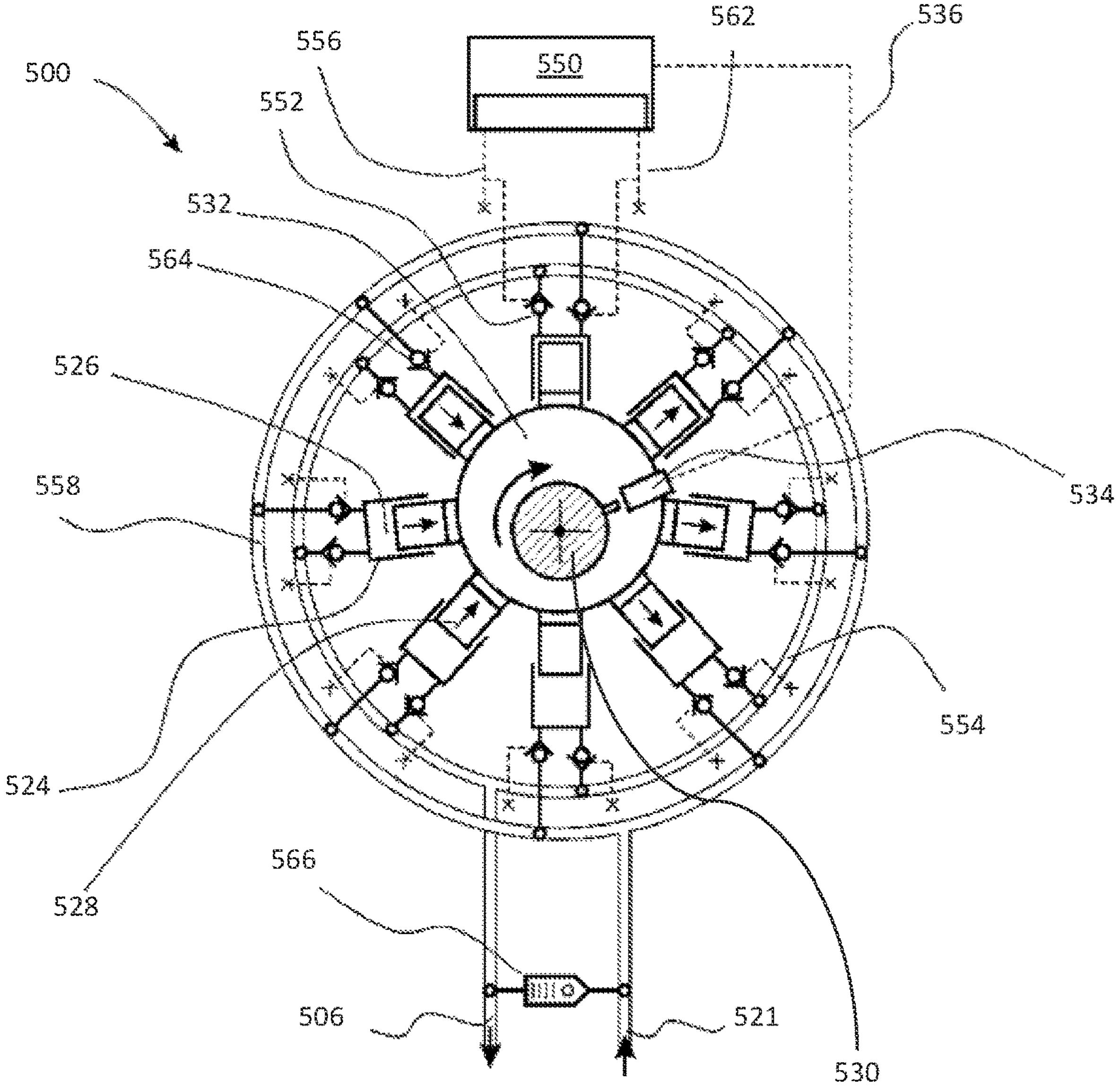
FIG. 4 is a schematic diagram of an example of a hydraulic machine.
Figure 5:
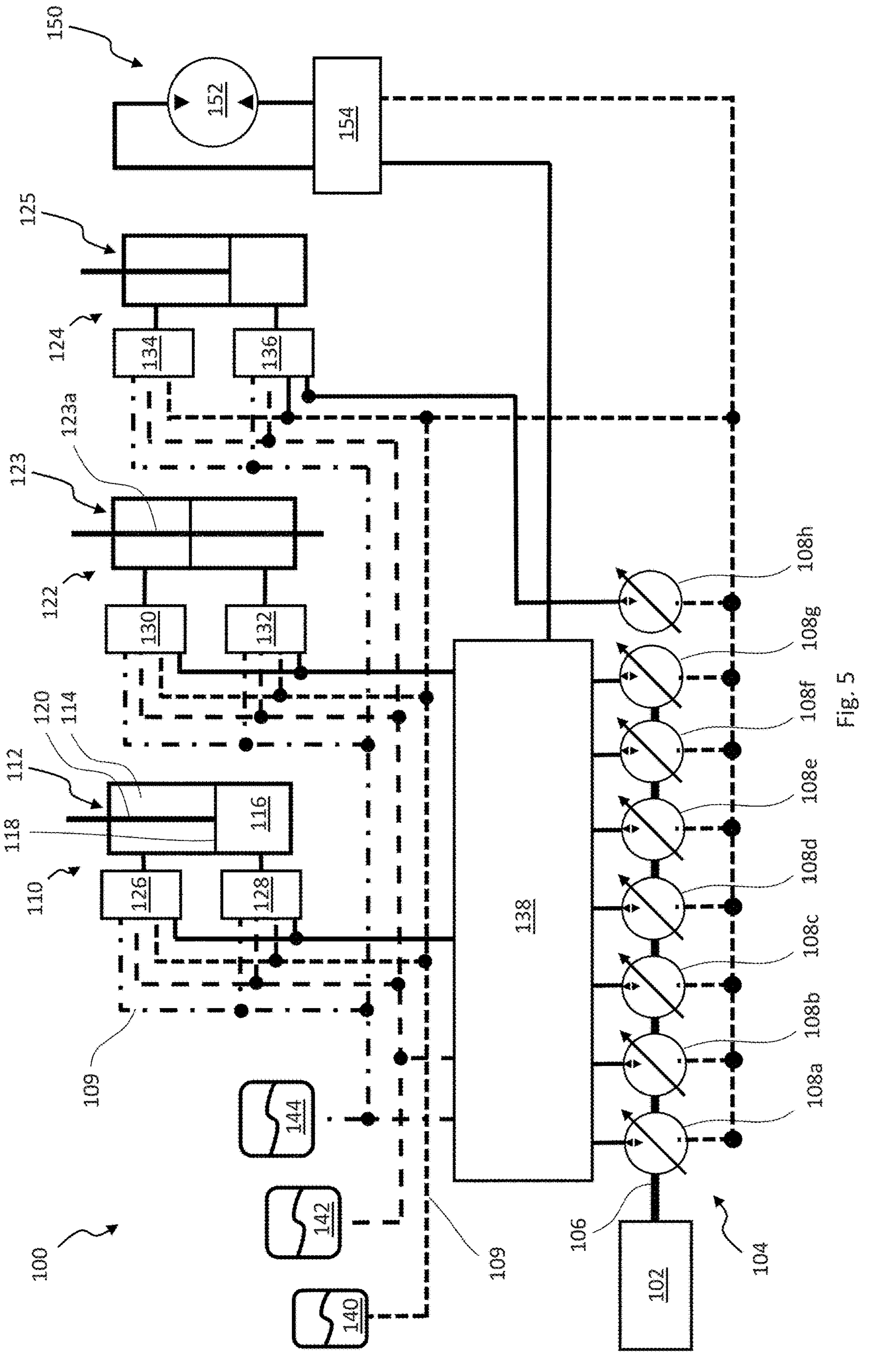
FIG. 5 is a schematic illustration of another example of hydraulic apparatus as described herein.

FIG. 4 is a schematic diagram of part of the hydraulic apparatus shown in FIGS. 1 and 2, and shows a single group of working chambers currently connected to one or more hydraulic components (e.g. an actuator) through a high pressure manifold 554. FIG. 5 provides detail on the first group 500, said group comprises a plurality of working chambers (8 are shown) having cylinders 524 which have working volumes 526 defined by the interior surfaces of the cylinders and pistons 528 (providing working surfaces 528) which are driven from a rotatable shaft 530 by an eccentric cam 532 and which reciprocate within the cylinders to cyclically vary the working volume of the cylinders. The rotatable shaft is firmly connected to and rotates with a drive shaft. A shaft position and speed sensor 534 sends electrical signals through a signal line 536 to a controller 550, which thus enables the controller to determine the instantaneous angular position and speed of rotation of the shaft, and to determine the instantaneous phase of the cycles of each cylinder.

The working chambers are each associated with Low Pressure Valves (LPVs) in the form of electronically actuated face-sealing poppet valves 552, which have an associated working chamber and are operable to selectively seal off a channel extending from the working chamber to a low-pressure hydraulic fluid manifold 554, which may connect one or several working chambers, or indeed all as is shown here, to the low-pressure hydraulic fluid manifold hydraulic circuit. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the controller via LPV control lines 556 to bring the working chamber out of fluid communication with the low-pressure hydraulic fluid manifold. The valves may alternatively be normally closed valves. As well as force arising from the pressure difference across the valve, flow forces from the passage of fluid across the valve, also influence the net force on the moving valve member.

The working chambers are each further associated with a respective High-Pressure Valve (HPV) 564 each in the form of a pressure actuated delivery valve. The HPVs open outwards from their respective working chambers and are each operable to seal off a respective channel extending from the working chamber through a valve block to a high-pressure hydraulic fluid manifold 558, which may connect one or several working chambers, or indeed all as is shown in FIG. 5. The HPVs function as normally-closed pressure-opening check valves which open passively when the pressure within the working chamber exceeds the pressure within the high-pressure hydraulic fluid manifold. The HPVs also function as normally-closed solenoid actuated check valves which the controller may selectively hold open via HPV control lines 562 once that HPV is opened by pressure within the associated working chamber. Typically, the HPV is not openable by the controller against pressure in the high-pressure hydraulic fluid manifold. The HPV may additionally be openable under the control of the controller when there is pressure in the high-pressure hydraulic fluid manifold but not in the working chamber, or may be partially openable.

In a pumping mode, the controller selects the net rate of displacement of hydraulic fluid from the working chamber to the high-pressure hydraulic fluid manifold by the hydraulic motor by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement.

In a motoring mode of operation, the controller selects the net rate of displacement of hydraulic fluid, displaced via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the controller. The controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the low-pressure fluid connection 506, and the high-pressure fluid connection 521 indicate hydraulic fluid flow in the motoring mode; in the pumping mode the flow is reversed. A pressure relief valve 566 may protect the first group from damage.

In normal operation, the active and inactive cycles of working chamber volume are interspersed to meet the demand indicated by the hydraulic machine control signal.

Throughout the description and claims of this specification, the words "comprise" and "contain" and variations of them mean "including but not limited to", and they are not intended to and do not exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

At least one of the hydraulic work functions may be performed using a further hydraulic actuator having at least one actuator chamber configured to be always in fluid communication with the hydraulic machine. Thus, it may be that one or more pump groups of the hydraulic machine are dedicated to other hydraulic actuators. In this way, the hydraulic fluid manifold and the valve arrangement can be kept simpler than if each pump group could be connected independently to multiple different hydraulic components, such as multiple different hydraulic actuators.

The hydraulic machine may be configured to be always in fluid communication with the hydraulic actuator or a given hydraulic actuator of the one or more hydraulic actuators. Thus, it may be that one or more pump groups of the hydraulic machine are dedicated to a particular hydraulic actuator of the one or more hydraulic actuators, simplifying the hydraulic fluid manifold and/or the valve arrangement. The hydraulic machine may be configured to be always in fluid communication with a given actuator chamber of the given hydraulic actuator. For example, FIG. 5 shows the chamber group (pump group) **108*h* dedicated to hydraulic actuator 125 to the exclusion of being in fluid communication with hydraulic actuators 112 and 123**.

The invention claimed is:

1. A vehicle having a hydraulic work function, the vehicle comprising:

a prime mover;

a hydraulic fluid manifold;

a hydraulic machine in fluid communication with the hydraulic fluid manifold, having a rotatable shaft in driven engagement with the prime mover, and configured such that, in operation, the hydraulic machine exchanges hydraulic fluid with the hydraulic fluid manifold by movement of the rotatable shaft, a hydraulic accumulator in fluid communication with the hydraulic fluid manifold and for exchanging hydraulic fluid with the hydraulic fluid manifold;

one or more hydraulic actuators, the one or more hydraulic actuators together having at least two actuator chambers in fluid communication with the hydraulic fluid manifold, the one or more hydraulic actuators to be used in the hydraulic work function;

a valve arrangement configured to selectively control fluid communication between at least one of the at least two actuator chambers and the hydraulic accumulator, via the hydraulic fluid manifold, and between at least one of the at least two actuator chambers and the hydraulic machine, via the hydraulic fluid manifold; and a controller configured to:

receive an actuator demand signal indicative of a demand to move the one or more hydraulic actuators; and control the hydraulic machine and the valve arrangement to cause movement of the one or more hydraulic actuators in accordance with the actuator demand signal, wherein to cause the movement of the one or more hydraulic actuators in accordance with the actuator demand signal, the hydraulic machine and the valve arrangement are controlled to bring the hydraulic accumulator into fluid communication with a first actuator chamber of the at least two actuator chambers, via a first portion of the hydraulic fluid manifold and the valve arrangement, and to synchronize therewith, a change in pressure in a second actuator chamber of the at least two actuator chambers, the second actuator chamber in fluid communication with the hydraulic machine via a second portion of the hydraulic fluid manifold and the valve arrangement, and the hydraulic machine comprises a plurality of pump groups, each comprising a plurality of working chambers in fluid communication with the hydraulic fluid manifold, each working chamber defined partially by a movable working surface mechanically coupled to the rotatable shaft, and wherein the controller is configured to control at least one of the pump groups differently to at least one other of the pump groups.

2. The vehicle of claim 1, wherein the valve arrangement comprises:

one or more actuator chamber valves each associated with, of the at least two actuator chambers, only a respective one actuator chamber; and a manifold valve group, in a fluid communication pathway within the hydraulic fluid manifold, between the one or more actuator chamber valves and the hydraulic machine.

3. The vehicle of claim 1, wherein the controller is configured to control the valve arrangement to bring at least one of the pump groups into fluid communication with the first portion of the hydraulic fluid manifold in a first configuration, and with the second portion of the hydraulic fluid manifold in a second configuration.

4. The vehicle of claim 1, wherein the vehicle is for performing a plurality of hydraulic work functions, wherein at least one of the hydraulic work functions is performed using a further hydraulic actuator and one or more of the plurality of pump groups of the hydraulic machine are configured to be in fluid communication with the further hydraulic actuator, to the exclusion of being in fluid communication with any other hydraulic actuator.

5. The vehicle of claim 1, wherein one or more of the plurality of pump groups of the hydraulic machine are configured to be in fluid communication with a given actuator chamber of a given hydraulic actuator, to the exclusion of being in fluid communication with any other actuator chamber of any of the one or more hydraulic actuators.

6. The vehicle of claim 1, wherein the actuator demand signal is indicative of a flow demand or a velocity demand in relation to the hydraulic work function.

7. The vehicle of claim 1, wherein the controller is configured to control the hydraulic machine and the valve arrangement depending on an error between a measured parameter of the one or more hydraulic actuators and a demanded value for the parameter of the one or more hydraulic actuators.

8. The vehicle of claim 1, wherein the controller is configured to determine a demanded force parameter of the one or more hydraulic actuators depending on a demand to move the one or more hydraulic actuators with a given velocity, and to control the hydraulic machine and the valve arrangement to cause movement of the one or more hydraulic actuators depending on the demanded force parameter.

9. The vehicle of claim 1, wherein the demand to move the one or more hydraulic actuators is determined from a user input.

10. The vehicle of claim 1, wherein the hydraulic work function includes at least one of a boom and a bucket.

11. The vehicle of claim 1, wherein the one or more hydraulic actuators are arranged such that an expansion in a volume of the first actuator chamber corresponds to a reduction in a volume of the second actuator chamber.

12. The vehicle of claim 1, wherein the hydraulic machine is a variable displacement hydraulic machine.

13. The vehicle of claim 1, wherein the hydraulic machine is a pump-motor.

14. A controller for a vehicle having a hydraulic work function, the controller configured to:

receive an actuator demand signal indicative of a demand to move one or more hydraulic actuators to be used in the hydraulic work function; and control a hydraulic machine of the vehicle and a valve arrangement to cause movement of the one or more hydraulic actuators in accordance with the actuator demand signal, wherein to cause the movement of the one or more hydraulic actuators in accordance with the actuator demand signal, the hydraulic machine and the valve arrangement are controlled to bring a hydraulic accumulator of the vehicle into fluid communication with a first actuator chamber of at least two actuator chambers, via a first portion of a hydraulic fluid manifold of the vehicle and the valve arrangement, and to synchronize therewith, a change in pressure of a second actuator chamber of the at least two actuator chambers, the second actuator chamber in fluid communication with the hydraulic machine via a second portion of the hydraulic fluid manifold and the valve arrangement, and the hydraulic machine comprises a plurality of pump groups, each comprising a plurality of working chambers in fluid communication with the hydraulic fluid manifold, each working chamber defined partially by a movable working surface mechanically coupled to a rotatable shaft, and wherein the controller is configured to control at least one of the pump groups differently to at least one other of the pump groups.

15. The controller of claim 14, wherein the valve arrangement comprises:

one or more actuator chamber valves each associated with, of the at least two actuator chambers, only a respective one actuator chamber; and a manifold valve group, in a fluid communication pathway within the hydraulic fluid manifold, between the one or more actuator chamber valves and the hydraulic machine.

16. The controller of claim 14, wherein one or more pump groups of the hydraulic machine are configured to be in fluid communication with a given actuator chamber of a given hydraulic actuator, to the exclusion of being in fluid communication with any other actuator chamber of any of the one or more hydraulic actuators.

17. The controller of claim 14, wherein the actuator demand signal is indicative of a flow demand or a velocity demand in relation to the hydraulic work function.

18. The controller of claim 14, wherein the controller is configured to control the hydraulic machine and the valve arrangement depending on an error between a measured parameter of the one or more hydraulic actuators and a demanded value for the parameter of the one or more hydraulic actuators.

19. The controller of claim 14, wherein the controller is configured to determine a demanded force parameter of the one or more hydraulic actuators depending on a demand to move the one or more hydraulic actuators with a given velocity, and to control the hydraulic machine and the valve arrangement to cause movement of the one or more hydraulic actuators depending on the demanded force parameter.

20. A method for controlling a vehicle having a hydraulic work function, the method comprising:

receiving a demand to move one or more hydraulic actuators to be used in the hydraulic work function; and controlling a hydraulic machine and a valve arrangement to bring a hydraulic accumulator of the vehicle into fluid communication with a first actuator chamber of the one or more hydraulic actuators, via a hydraulic fluid manifold of the vehicle and the valve arrangement, and synchronized therewith, changing a pressure in a second actuator chamber of the one or more hydraulic actuators, the second actuator chamber in fluid communication with the hydraulic machine via the hydraulic fluid manifold and the valve arrangement, to thereby cause movement of the one or more hydraulic actuators in accordance with the demand, wherein the hydraulic machine comprises a plurality of pump groups, each comprising a plurality of working chambers in fluid communication with the hydraulic fluid manifold, each working chamber defined partially by a movable working surface mechanically coupled to a rotatable shaft, and the method comprises controlling at least one of the pump groups differently to at least one other of the pump groups.

* * * * *